(12) United States Patent
Shafer et al.

(10) Patent No.: US 11,370,944 B2
(45) Date of Patent: *Jun. 28, 2022

(54) UV CURABLE EPOXY/ACRYLATE ADHESIVE COMPOSITION

(71) Applicant: 3M INNOVATIVE PROPERTIES COMPANY, St. Paul, MN (US)

(72) Inventors: Kathleen S. Shafer, Woodbury, MN (US); Thomas Q. Chastek, St. Paul, MN (US); Cyrus A. Anderson, Billingham, WA (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/871,543

(22) Filed: May 11, 2020

(65) Prior Publication Data

US 2020/0270492 A1 Aug. 27, 2020

Related U.S. Application Data

(63) Continuation of application No. 15/574,877, filed as application No. PCT/US2016/032419 on May 13, 2016, now Pat. No. 10,676,655.

(60) Provisional application No. 62/170,892, filed on Jun. 4, 2015.

(51) Int. Cl.
| | |
|---|---|
| *C08F 2/46* | (2006.01) |
| *C08F 2/50* | (2006.01) |
| *C08G 61/04* | (2006.01) |
| *C09J 133/14* | (2006.01) |
| *C08L 33/14* | (2006.01) |
| *C08L 63/00* | (2006.01) |
| *C09J 7/40* | (2018.01) |
| *C08F 2/48* | (2006.01) |
| *C08L 71/00* | (2006.01) |
| *C09J 163/00* | (2006.01) |
| *C09J 131/04* | (2006.01) |
| *C09J 137/00* | (2006.01) |

(52) U.S. Cl.
CPC .............. *C09J 133/14* (2013.01); *C08F 2/48* (2013.01); *C08L 33/14* (2013.01); *C08L 63/00* (2013.01); *C08L 71/00* (2013.01); *C09J 7/40* (2018.01); *C09J 163/00* (2013.01); *C08G 2650/56* (2013.01); *C09J 131/04* (2013.01); *C09J 137/00* (2013.01)

(58) Field of Classification Search
CPC . C09J 7/40; C09J 163/00; C09J 133/14; C09J 133/04; C09J 137/00; C08G 2650/56; C08L 71/00; C08L 71/02; C08L 63/00; C08L 33/14; C08L 31/04
USPC ................. 522/6, 189, 184, 71, 1; 520/1
See application file for complete search history.

(56) References Cited

U.S. PATENT DOCUMENTS

| | | |
|---|---|---|
| 4,173,476 A | 11/1979 | Smith |
| 4,250,053 A | 2/1981 | Smith |
| 4,256,828 A | 3/1981 | Smith |
| 4,619,979 A | 10/1986 | Kotnour |
| 4,843,134 A | 6/1989 | Kotnour |
| 5,059,701 A | 10/1991 | Keipert |
| 5,191,101 A | 3/1993 | Palazzotto |
| 5,252,694 A | 10/1993 | Willett |
| 5,256,828 A | 10/1993 | Cuscurida |
| 5,436,063 A | 7/1995 | Follett |
| 5,637,646 A | 6/1997 | Ellis |
| 5,709,948 A | 1/1998 | Perez |
| 5,721,289 A | 2/1998 | Karim |
| 5,804,610 A | 9/1998 | Hamer |
| 6,057,382 A | 5/2000 | Karim |
| 6,136,384 A * | 10/2000 | Karim ............. C08L 63/00 427/516 |
| 6,254,954 B1 | 7/2001 | Bennett |
| 6,274,643 B1 | 8/2001 | Karim |
| 7,144,604 B2 | 12/2006 | Husemann |
| 7,410,694 B2 | 8/2008 | Husemann |
| 8,785,517 B2 | 7/2014 | Weikel |
| 10,676,655 B2 * | 6/2020 | Shafer ............. C09J 7/40 |
| 2002/0182955 A1 | 12/2002 | Weglewaski |
| 2012/0059127 A1 * | 3/2012 | Ha ............. C08G 18/718 525/327.2 |
| 2014/0158296 A1 | 6/2014 | Wigdorski |
| 2018/0127625 A1 * | 5/2018 | Shafer ............. C08L 33/14 |

FOREIGN PATENT DOCUMENTS

| | | |
|---|---|---|
| EP | 1026218 | 8/2000 |
| JP | H11181361 | 7/1999 |
| WO | WO 1996-07522 | 3/1996 |
| WO | WWO 2013/067947 | 5/2013 |
| WO | WO 2016-196561 | 12/2016 |
| WO | WO 2017-117163 | 7/2017 |

OTHER PUBLICATIONS

"1, 3-Epoxide Polymer", Emulsion Polymerization to Fibers, Manufacture, Encyclopedia of Polymer Science and Technology, vol. 6, pp. 322-382, (1986).
International Search report for PCT International Application No. PCT/US2016/032419 dated Sep. 30, 2016, 4 pages.

* cited by examiner

*Primary Examiner* — Jessica Whiteley

(74) *Attorney, Agent, or Firm* — Carlos M. Téllez Rodriguez; 3M Innovative Properties Company

(57) ABSTRACT

An adhesive composition is described comprising a tetrahydrofurfuryl (meth)acrylate copolymer; an epoxy resin; a polyether polyol; and a hydroxy-functional film-forming polymer. The adhesive may be used in structural and semi-structural bonding applications.

19 Claims, No Drawings

UV CURABLE EPOXY/ACRYLATE ADHESIVE COMPOSITION

FIELD OF THE INVENTION

The present invention is directed to structural and semistructural bonding adhesives adhesive articles, and methods for preparing the adhesive and articles. The present invention is further directed to articles of manufacture containing one or more components bonded together with structural bonding adhesive.

BACKGROUND

Structural bonding tapes are useful for bonding one or more substrates to one another. Many structural bonding tapes fall into one of two groups: (1) heat-curable structural bonding tapes, and (2) ultraviolet (UV) light-activatable structural bonding tapes. As suggested by the class name, heat-curable structural bonding tapes require heat to cure the adhesive composition of the tape. The UVi structural bonding tapes contain an adhesive composition that will begin to cure when exposed to UV light, but does not require heat for curing. Heat may be used to accelerate the rate of cure for UVi structural bonding tapes.

Typically, a length of structural bonding tape or a die cut piece of tape is removed from a roll, and attached to a first substrate using finger pressure. In the case of UVi structural bonding tapes, the structural bonding tape can be exposed to actinic radiation, such as UV. Then, a second substrate is brought into contact with the exposed surface of the structural bonding tape, and pressure is applied to the substrates for a period of time. Heat-curable structural bonding tapes, and optionally UVi structural bonding tapes, are then exposed to heat and the assembly is then allowed to cool. The result is a bonded article.

Further, conventional Uvi structural bonding tape formulations possess high cold flow properties. Cold flow is a measure of the creep behavior of a material at non-elevated temperatures. Many conventional UVi tape materials possess undesirably high cold flow properties, which result in significant material flow under roll winding tensions and stacking weight. As a result, these materials may require cold storage and/or special packaging to maintain dimensionally stable rolls and die cut parts.

In addition, many current structural adhesive compositions require heat to cure the adhesive composition. In a process of making bonded articles, the bonded article must be subjected to a heating step in order to cure the adhesive composition as well as a cooling step in order to allow for further handling and/or packaging of the bonded article. From a processing standpoint, a process of making bonded articles without a heating step would be highly desirable.

What is needed in the art is a structural adhesive or bonding tape formed from an adhesive composition formulation, which has low temperature bonding performance and/or may be used to bonding different substrates having different coefficients of thermal expansion. In addition, what is needed in the art is a UVi structural bonding tape having a tape construction, which allows the tape to be light-activatable from one side of the tape. Typical substrates relevant to UVi structural bonding tape are not transparent to UV light and therefore prevent UV initiation after the bond is fully assembled.

SUMMARY

The present disclosure addresses some of the difficulties and problems discussed above by the discovery of a novel structural- or semi-structural adhesive having improved cold flow properties, as well as, exceptional adhesion properties. The structural bonding adhesive possesses desired strength and adhesion properties. The adhesive is light-activated (i.e., cure is initiated upon exposure to a light source) and does not require heat for curing. The structural bonding adhesive may be used in a number of applications, in particular, as an adhesive for bonding together one or more substrates.

"Semi-structural Adhesives" are those cured adhesives that have an overlap shear strength of at least about 0.75 MPa, more preferably at least about 1.0 MPa, and most preferably at least about 1.5 MPa. Those cured adhesives having a particularly high overlap shear strength, however, are referred to as structural adhesives. Structural adhesives are those cured adhesives that have an overlap shear strength of at least about 3.5 MPa, more preferably at least about 5 MPa, and most preferably at least about 7 MPa.

In many embodiments, these adhesives provide at least one of 1) an overlap shear value of >5 MPa, 2) a cleavage value (plastic to glass of >40 N, and 3) a creep of <500% strain, using the test methods described herein.

The present invention describes a curable pressure sensitive adhesive that upon curing provides a semi-structural or structural adhesive, wherein the pressure sensitive adhesive comprises:
    a) a tetrahydrofurfuryl (meth)acrylate copolymer;
    b) an epoxy resin;
    c) a polyether polyol;
    d) a hydroxy-functional film-forming polymer; and
    e) a photocatalyst.

DETAILED DESCRIPTION

The adhesive composition comprises, in part, a tetrahydrofurfuryl (meth)acrylate copolymer component. Unless otherwise specified, the THF acrylates and methacrylates will be abbreviated as THFA. More particularly, the adhesive composition comprises a copolymer of tetrahydrofurfuryl (meth)acrylate, a $C_1$-$C_8$ (meth)acrylate ester and an optional cationically reactive functional (meth)acrylate.

In addition to the tetrahydrofurfuryl (meth)acrylate, the copolymer further comprises a $C_1$-$C_8$ alkyl (meth)acrylate ester monomer. Useful monomers include the acrylates and methacrylate of methyl, ethyl, propyl, isopropyl, butyl, pentyl, hexyl, heptyl and octyl alcohols, including all isomers, and mixtures thereof. It is preferred that the alcohol is selected from $C_3$-$C_6$ alkanols, and in certain embodiments, the carbon number molar average of the alkanols is $C_3$-$C_6$. It has been found that within this range the copolymer has sufficient miscibility with the epoxy resin component and it allows for formulation of a UVi SBT with a useful overall balance of adhesive properties, including overlap shear.

The carbon number molar average may be calculated by summing the number of moles of each alkanol ($C_{1-8}$ alkanols) multiplied by the carbon number of each alkanol, and dividing the result by the total number of moles of alkanols: $\Sigma_{\alpha-\omega}$[(Moles of alkanol)×(# carbon atoms for alkanol)]/# moles of alkanols $\alpha$ to $\omega$.

In addition, the copolymer may contain a cationically reactive monomer, i.e. a (meth)acrylate monomer having a cationically reactive functional group. Examples of such monomers include, for example, glycidyl acrylate, glycidyl methacrylate, hydroxyethyl acrylate, hydroxyethyl methacrylate, hydroxypropyl methylacrylate, hydroxybutyl acrylate and alkoxysilylalkyl (meth)acrylates, such as trimethoxysilylpropyl acrylate.

For stability of the polymerizable composition, the copolymer contains essentially no acid functional monomers, whose presence would initiate polymerization of the epoxy resin prior to UV curing. For the same reason, it is preferred that the copolymer not contain any amine-functional monomers. Furthermore, it is preferred that the copolymer not contain any acrylic monomers having moieties sufficiently basic so as to inhibit cationic cure of the adhesive composition.

The THFA copolymer generally comprises polymerized monomer units of:

a) 40-60 wt. %, preferably >50 to 60 wt. %, of tetrahydrofuryl (meth)acrylate
b) 40-60 wt. %, preferably 40 to 50 wt. %, of $C_1$-$C_8$, preferably $C_3$-$C_6$ alkyl (meth)acrylate ester monomers;
c) 0 to 10 wt. %, preferably 1 to 5 wt. % of cationically reactive functional monomers; wherein the sum of a)-c) is 100 wt. %.

The adhesive compositions comprise one or more THFA acrylate copolymers in an amount, which varies depending on the desired properties of the adhesive. Desirably, the adhesive composition comprises one or more THFA acrylate copolymers in an amount of from 15 to 50 parts, preferably 25-35 parts by weight, based on the 100 parts total weight of the monomers/copolymers in the adhesive composition.

The adhesive comprises one or more epoxy resins. The epoxy resins or epoxides that are useful in the composition of the present disclosure may be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or mixtures thereof. Preferred epoxides contain more than 1.5 epoxy group per molecule and preferably at least 2 epoxy groups per molecule. The useful materials typically have a weight average molecular weight of about 150 to about 10,000, and more typically of about 180 to about 1,000. The molecular weight of the epoxy resin is usually selected to provide the desired properties of the cured adhesive. Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene poly epoxy), and polymeric epoxides having pendant epoxy groups (e.g., a glycidyl methacrylate polymer or copolymer), and mixtures thereof. The epoxide-containing materials include compounds having the general formula:

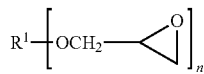

where R1 is an alkyl, alkyl ether, or aryl, and n is 1 to 6.

These epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Also useful are polyhydric phenolic formaldehyde condensation products as well as polyglycidyl ethers that contain as reactive groups only epoxy groups or hydroxy groups. Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p. 322 (1986).

The choice of the epoxy resin used depends upon the end use for which it is intended. Epoxides with flexibilized backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Examples of commercially available epoxides useful in the present disclosure include diglycidyl ethers of bisphenol A (e.g, those available under the trade designations EPON 828, EPON 1001, EPON 1004, EPON 2004, EPON 1510, and EPON 1310 from Momentive Specialty Chemicals, Inc., and those under the trade designations D.E.R. 331, D.E.R. 332, D.E.R. 334, and D.E.N. 439 available from Dow Chemical Co.); diglycidyl ethers of bisphenol F (e.g., that are available under the trade designation ARALDITE GY 281 available from Huntsman Corporation); silicone resins containing diglycidyl epoxy functionality; flame retardant epoxy resins (e.g., that are available under the trade designation DER 560, a brominated bisphenol type epoxy resin available from Dow Chemical Co.); and 1,4-butanediol diglycidyl ethers.

Epoxy containing compounds having at least one glycidyl ether terminal portion, and preferably, a saturated or unsaturated cyclic backbone may optionally be added to the composition as reactive diluents. Reactive diluents may be added for various purposes such as to aid in processing, e.g., to control the viscosity in the composition as well as during curing, to flexibilize the cured composition, and to compatibilize materials in the composition.

Examples of such diluents include: diglycidyl ether of cyclohexanedimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N'N'-tetraglycidyl meta-xylylene diamine, and vegetable oil polyglycidyl ether. Reactive diluents are commercially available under the trade designation HELOXY 107 and CARDURA N10 from Momentive Specialty Chemicals, Inc. The composition may contain a toughening agent to aid in providing the desired overlap shear, peel resistance, and impact strength.

The adhesive composition desirably contains one or more epoxy resins having an epoxy equivalent weight of from about 100 to about 1500. More desirably, the adhesive contains one or more epoxy resins having an epoxy equivalent weight of from about 300 to about 1200. Even more desirably, the adhesive contains two or more epoxy resins, wherein at least one epoxy resin has an epoxy equivalent weight of from about 300 to about 500, and at least one epoxy resin has an epoxy equivalent weight of from about 1000 to about 1200.

The adhesive composition may comprise one or more epoxy resins in an amount, which varies depending on the desired properties of the structural adhesive layer. Desirably, the adhesive composition comprises one or more epoxy resins in an amount of from 25 to 50 parts, preferably 35-45 parts by weight, based on the 100 parts total weight of the monomers/copolymers in the adhesive composition.

The adhesive composition further comprises a lower Mw, liquid (at 25° C.) hydroxy-functional polyether (polyether polyol) in amounts of 5-15 parts, relative to 100 parts total weight of the monomers/copolymers in the adhesive composition.

Examples of this class of a hydroxy-functional polyether compound include, but are not limited to, polyoxyethylene and polyoxypropylene glycols; polyoxyethylene and polyoxypropylene triols and polytetramethylene oxide glycols. The polyoxyalkylene polyols are particularly suitable for retarding the curing reaction so that the "open time" of the adhesive composition can be increased. As used herein, the term "open time" is used to mean the period of time after an adhesive composition has been irradiated, during which time the adhesive composition remains sufficiently uncured for a second substrate to be bonded thereto.

The open time of the adhesive composition is desirably at least 2 minutes after exposure to an energy dose of about 1.6 J/cm$^2$ of actinic radiation. However, if one or both substrates that are being bonded together are translucent for the radiation to which the structural adhesive layer is to be exposed, the open time is of no relevance because in that case the exposure to the radiation can be effected through the translucent substrate after both substrates have been attached to each other by the adhesive. When both substrates of the assembly are opaque, the adhesive will be exposed to actinic radiation prior to attaching the second substrate thereto. In this case, an open time of at least 2 minutes is desirable to allow for suitable workability of the structural adhesive layer.

Commercially available hydroxy-functional poly(alkylenoxy) compounds suitable for use in the present invention include, but are not limited to, the POLYMEG™ series of polytetramethylene oxide glycols (available from Lyondellbasell, Inc., Jackson, Tenn.), the TERATHANE™ series of polytetramethylene oxide glycols (from Invista, Newark, Del.); the POLYTHF™ series of polytetramethylene oxide glycol from BASF Corp. (Charlotte, N.C.); the ARCOL™ series of polyoxypropylene polyols (from Bayer MaterialScience., Los Angeles, Calif.) and the VORANOL™ series of polyether polyols from Dow Automotive Systems, Auburn Hills, Mich.

The adhesive layer further contains at least one hydroxyl-functional film-forming polymer having at least one and desirably at least two hydroxyl groups. Further, the terms hydroxyl-functional film-forming polymer does not include the polyether polyols described above, which also contain hydroxyl groups. Desirably, the film-forming polymer are substantially free of other "active hydrogen" containing groups such as amino and mercapto moieties. Further, the film-forming polymer are also desirably substantially free of groups, which may be thermally and/or photolytically unstable so that the compounds will not decompose when exposed to actinic radiation and/or heat during curing.

The hydroxyl-containing film-forming polymer contains two or more primary or secondary aliphatic hydroxyl groups (i.e., the hydroxyl group is bonded directly to a non-aromatic carbon atom). In some embodiments, the hydroxyl-functional film-forming polymer has a hydroxyl number of at least 0.01. It is believed the hydroxyl groups participate in the cationic polymerization with the epoxy resin.

The hydroxyl-functional film-forming polymer may be selected from phenoxy resins, ethylene-vinyl acetate (EVA) copolymers (solid at 25° C.), polycaprolactone polyols, polyester polyols, and polyvinyl acetal resins that are solid at 25° C. The hydroxyl group may be terminally situated, or may be pendent from a polymer or copolymer.

It has been found that the addition of a film-forming polymer to the structural adhesive composition improves the dynamic overlap shear strength and/or decreases the cold flow of the adhesive layer.

One useful class of hydroxyl-containing film-forming polymers is hydroxy-containing phenoxy resins. Particularly desirable phenoxy resins are those that are derived from the polymerization of a di-glycidyl bisphenol compound. Typically, the phenoxy resin has a number average molecular weight of less than 60,000, desirably in the range of about 20,000 to about 30,000. Commercially available phenoxy resins suitable for use in the present invention include, but are not limited to, PAPHEN™ PKHP-200, available from Inchem Corp. (Rock Hill, S.C.) and the SYNFAC™ series of polyoxyalkylated bisphenol A (from Milliken Chemical, Spartanburg, S.C.) such as SYN FAC™ 8009, 773240, 8024, 8027, 8026, 8071 and 8031;

A second useful class of hydroxyl-containing film-forming polymers is ethylene-vinyl acetate (EVA) copolymer resins. EVA resins contain small amounts of free hydroxyl groups, and it is believed that the EVA copolymers are further deacetylated during cationic polymerization.

Suitable ethylene-vinyl acetate copolymer resins include, but are not limited to, thermoplastic ethylene-vinyl acetate copolymer resins containing at least about 28 percent by weight vinyl acetate. In one embodiment of the present invention, the ethylene-vinyl acetate copolymer comprises a thermoplastic copolymer containing at least about 28 percent by weight vinyl acetate, desirably at least about 40 percent by weight vinyl acetate, more desirably at least about 50 percent by weight vinyl acetate, and even more desirably at least about 60 percent by weight vinyl acetate by weight of the copolymer. In a further embodiment of the present invention, the ethylene-vinyl acetate copolymer contains an amount of vinyl acetate ranging from about 28 to about 99 weight percent of vinyl acetate, desirably from about 40 to about 90 weight percent of vinyl acetate, more desirably from about 50 to about 90 weight percent of vinyl acetate, and even more desirably from about 60 to about 80 weight percent vinyl acetate in the copolymer.

Examples of commercially available ethylene-vinyl acetate copolymers, which may be used in the present invention include, but are not limited to, the Elvax series, including ELVAX™ 150, 210, 250, 260, and 265 from E. I. Du Pont de Nemours and Co., Wilmington, Del., the ATEVA™ series from Celanese, Inc., Irving, Tex.); the LEVAPREN™ 400 from Bayer Corp., Pittsburgh, Pa. including, LEVAPREN™ 450, 452, and 456 (45 weight percent vinyl acetate); LEVAPREN™ 500 HV (50 weight percent vinyl acetate); LEVAPREN™ 600 HV (60 weight percent vinyl acetate); LEVAPREN™ 700 HV (70 weight percent vinyl acetate); and LEVAPREN™ KA 8479 (80 weight percent vinyl acetate), each from Lanxess Corp.

Additional useful film-forming polymers include the TONE™ of polycaprolactone polyols series available from Dow Chemical, Midland, Mich., the CAPA™ series of polycaprolactone polyols from Perstorp Inc., the DESMO- PHEN™ series of saturated polyester polyols (available from Bayer Corporation, Pittsburgh, Pa.) such as DESMO-PHEN™ 631A 75.

The adhesive layer comprises one or more hydroxyl-containing film-forming polymers resins in an amount, which varies depending on the desired properties of the structural adhesive layer. Desirably, the adhesive composition comprises one or more hydroxyl-containing film-forming polymer resins in an amount of up to about 25 parts by weight, based on 100 parts total weight of the monomers/copolymers in the adhesive composition. More desirably, the adhesive composition comprises one or more film-forming polymers resins in an amount of from about 10 to about 25 parts by weight, based on 100 parts total weight of the monomers/copolymers in the adhesive composition. Even more desirably, the structural adhesive layer of the structural bonding tape of the present invention comprises one or more film-forming polymer resins in an amount of 15 to about 20 parts by weight, based on 100 parts total weight of the monomers/copolymers in the adhesive composition.

In summary, the curable adhesive composition comprises:
a. 15 to 50 parts of a THFA (meth)acrylate copolymer;
b. 25 to 50 parts of an epoxy resin component;
c. 5-15 parts of a polyether polyol;
d. 10 to 25 parts of a hydroxy-functional film-forming polymer;
wherein the sum of a) to d) is 100 parts by weight; and
e. 0.01 to 1 parts of a cationic photoinitiator, relative to 100 parts of a) to d).

In many embodiments the amount of epoxy resin is greater than the THFA copolymer; the weight ratio of epoxy resin to acrylate polymer is from 1.1:1 to 5:1.

The adhesive composition may further comprise up to about 50 parts by weight (relative to 100 parts by weight of a) to d)), desirably, up to about 10 percent, of various additives such as fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, and the like, such as silica, glass, clay, talc, pigments, colorants, glass beads or bubbles, and antioxidants, so as to reduce the weight and/or cost of the structural adhesive layer composition, adjust viscosity, and/or provide additional reinforcement or modify the thermal conductivity of the adhesive compositions and articles of the present invention so that a more rapid or uniform cure may be achieved. The nature of the additive and the amount thereof should not interfere with the transmissivity of the curable adhesive.

The adhesive composition may be prepared by combining the tetrahydrofurfuryl (meth)acrylate copolymer with an epoxy resin, polyether polyol, the hydroxy-functional film-forming polymer and a cationic photoinitiator, and photopolymerizing the mixture by irradiation with actinic radiation, preferably UV.

In some embodiments, the (meth)acrylate copolymer is separately prepared by free radical polymerization of the monomer mixture with a photo- or thermal initiator. The copolymers may be prepared by any conventional free radical polymerization method, including solution, radiation, bulk, dispersion, emulsion, solventless, and suspension processes. The resulting adhesive copolymers may be random or block (co)polymers.

Thermal initiators useful in preparing the THFA copolymers are initiators that, on exposure to heat, generate free-radicals which initiate (co)polymerization of the monomer mixture. Suitable water-soluble initiators include those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis (4-cyanopentanoic acid) and its soluble salts (e.g., sodium, potassium). Suitable initiators also include those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)).

When used, thermal initiators may comprise from about 0.05 to about 1 part by weight, preferably about 0.1 to about 0.5 part by weight based on 100 parts by weight of monomer components in the pressure-sensitive adhesive.

Useful photoinitiators include benzoin ethers such as benzoin methyl ether and benzoin isopropyl ether; substituted acetophenones such as 2, 2-dimethoxyacetophenone, available as Irgacure™ 651 photoinitiator (BASF, Ludwigshafen, Germany), 2,2 dimethoxy-2-phenyl-1-phenylethanone, available as Esacure™ KB-1 photoinitiator (Sartomer Co.; West Chester, Pa.), and dimethoxyhydroxyacetophenone; substituted ca-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Such photoinitiators preferably are present in an amount of from 0.1 to 1.0 pbw per 100 parts of the monomer mixture. The monomer mixture and the photoinitiator may be irradiated with activating UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 24 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

The polymerizations may be conducted in the presence of, or preferably in the absence of, suitable solvents such as ethyl acetate, toluene and tetrahydrofuran which are unreactive with the functional groups of the components of the syrup polymer.

A syrup polymer technique comprises partially polymerizing monomers to produce a syrup polymer comprising the THFA (meth)acrylate copolymer and unpolymerized monomers. The syrup polymer composition is polymerized to a useful coating viscosity, which may be combined with the other components of the adhesive composition, optionally coated onto a substrate (such as a tape backing) and further polymerized. Partial polymerization provides a coatable solution of the THFA (meth)acrylate solute copolymer in one or more solvent monomers. It will be understood that if a syrup polymerization method is used, additional free radical initiator is necessary to fully polymerize the solvent monomers after compounding.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers. Preferably, the first copolymer is prepared by the adiabatic batch polymerization process wherein the total of the absolute value of any energy exchanged to or from the batch during the course of reaction will be less than about 15% of the total energy liberated due to reaction for the corresponding amount of polymerization that has occurred during the time that polymerization has occurred, as described in U.S. Pat. No. 5,637,646 (Ellis), incorporated herein by reference.

Preferably the components are combined and photopolymerized using the methods described in the methods described for polymerizing packaged pre-adhesive compositions described in WO9607522 (Hamer et al.) and in U.S. Pat. No. 5,804,610 (Hamer et al.), incorporated herein by reference.

In the methods of Hamer, the packaging material used to form the reaction vessel or container is preferably made of a material that when combined with the adhesive composition does not substantially adversely affect the desired adhesive characteristics. A hot melt coated adhesive produced from a mixture of the adhesive composition and the packaging material may have improved adhesive properties compared to a hot melt coated adhesive produced from the adhesive composition alone.

In some embodiments a reaction mixture is coated onto a carrier web, covered with a sheet material, and polymerized, wherein the carrier web, the sheet material, or both, are hot melt coatable with the adhesive. If both the carrier web and the sheet material are hot melt coatable, the resulting composite can be fed directly into a hot melt coater, or cut into smaller strips or pieces and fed to the hot melt coater. If only one of the carrier web or the sheet material is hot melt-coatable with the adhesive, the non-coatable entity is removed before the adhesive is hot melt coated. To facilitate handling after the non-coatable entity is removed, the polymerized adhesive can be folded over onto itself so that the coatable entity substantially surrounds the major surfaces of the coated adhesive. The adhesive web can then be fed into a hot melt coater, or it can be cut to smaller strips or pieces before hot melt coating.

If either the carrier web or the sheet material are not hot melt coatable with the adhesive it should be treated, if necessary, so that the adhesive can be removed easily from it. Such treatments include silicone release coatings, polyfluoropolyether coatings, and polyfluoroethylene coatings such as Teflon™.

If desired, a chain transfer agent may be added to the monomer mixture to produce a THFA copolymer having the desired molecular weight. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide.

The chain transfer agent may be used in amounts such that THFA copolymer has a a tan delta of 0.75 to 3.0 at the processing temperature of the adhesive, e.g. 120° C. The monomer mixture may further comprise up to about 5 parts by weight of a chain transfer agent, typically about 0.01 to about 5 parts by weight, if used, preferably about 0.05 parts by weight to about 0.5 parts by weight, based upon 100 parts by weight of the total monomer mixture.

The components of the adhesive composition may be combined and mixed in a suitable mixing vessel at an elevated temperature low enough to avoid decomposition of any photoinitiator present in the adhesive composition. Although mix times may vary, the components of the adhesive composition are desirably mixed for a period of time sufficient to form a uniform mixture of components.

After mixing, the adhesive composition may be formed into its final shape by a variety of different methods. For example, the adhesive composition may be coated onto a release liner to form a layer using a heated knife coater. Alternatively, the components the adhesive composition may be compounded in an extruder and then extruded through a die having a desired profile to produce a shaped strip of adhesive; that is, a strip having a desired cross-sectional shape. In a further approach, the adhesive composition may be extruded as a mass and delivered between a pair of motor-driven chilled rolls spaced apart a predetermined distance to form a flat sheet of the structural adhesive layer adhesive composition that may be subsequently calendared to a desired thickness.

In a batch process, the adhesive composition is prepared by mixing the various ingredients in one or more suitable vessels, desirably vessels that are not transparent to actinic radiation. The liquid components, such as liquid epoxies and hydroxyl-containing materials, may be premixed in a first vessel at a temperature sufficient to liquefy the components. The components may be added simultaneously or sequentially in any order; however, it is desirable to add the cationic photoinitiator after all of the other components have thoroughly mixed.

In a continuous process, the adhesive composition is mixed in an extruder, for example a twin screw extruder, equipped with a downstream port, a static mixer, and an appropriate output orifice (i.e., film die, sheet die, profile die, etc.) and a take-up roll and wind up roll(s), as appropriate. Take-up line speed may be adjusted as appropriate for the output form.

The compounded adhesive composition may be cured with a cationic photoinitiator. Suitable photoinitiators include, but are not limited to, onium salts and cationic organometallic salts, both of which are described in U.S. Pat.

No. 5,709,948 and photoactivatable organometallic complex salts such as those described in U.S. Pat. Nos. 5,059,701; 5,191,101; and 5,252,694.

Useful onium salts include diazonium salts, such as aryl diazonium salts; halonium salts, such as diaryliodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Suitable aromatic iodonium complex salts are described more fully in U.S. Pat. No. 4,256,828. In one embodiment of the present invention, the desired aromatic iodonium complex salt is $[(Ar)_2I]^+[PF6]^-$ or $[(Ar)_2I]^+[SbF_6]^-$, where Ar are the same or different and each comprises an aromatic group having from 4 to 20 carbon atom.

The aromatic iodonium complex salts useful in the present invention are photosensitive in the ultraviolet region of the spectrum. However, they can be sensitized to the near ultraviolet and the visible range of the spectrum by sensitizers for known photolyzable organic halogen compounds. Illustrative sensitizers include colored aromatic polycyclic hydrocarbons, as described in U.S. Pat. No. 4,250,053. Suitable sensitizers should be chosen so as to not interfere appreciably with the cationic cure of the epoxy resin in the adhesive composition.

Suitable sulfonium salts include triaryl-substituted salts such as triphenylsulfonium hexafluoroantimonate and p-(phenyl(thiophenyl)diphenylsulfonium hexafluoroantimonate are the desired sulfonium salts. Other sulfonium salts useful in the present invention are described more fully in U.S. Pat. Nos. 5,256,828 and 4,173,476. Aromatic sulfonium complex salts useful in the present invention are typically photosensitive in the ultraviolet region of the spectrum. However, they can be sensitized to the near ultraviolet and the visible range of the spectrum by a select group of sensitizers such as described in U.S. Pat. Nos. 4,256,828 and 4,250,053.

If a sensitizer is used in combination with an onium salt as described above, it should be chosen so as to not interfere appreciably with the cationic cure of the epoxy resin in the adhesive composition.

In some embodiments, a sensitizer may be used as a dye or an indicator which 1) identifies the location of the adhesive in the connector; 2) participates in the curing reaction; and 3) undergoes a color change which reflects the onset of curing. When used as a color change indicators in the curable composition, the composition may be cured at an irradiated wavelength corresponding to the lambda max of the photoinitiator, rather than the sensitizer. The incipient acid released from the initiator reacts with the sensitizer, effecting a color change.

Suitable sensitizers are believed to include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones), ketocoumarins, aminoarylketones and p-substituted aminostyryl ketone compounds are preferred sensitizers. For applications requiring high sensitivity, it is preferred to employ a sensitizer containing ajulolidinyl moiety. For applications requiring deep cure (e.g., where the coating or strengthening fibers attenuate radiation of similar wavelengths), it is preferred to employ sensitizers having an extinction coefficient below about 1000, more preferably below about 100, at the desired wavelength of irradiation for photopolymerization. Alternatively, sensitizers that exhibit bleaching at the appropriate wavelength(s) may also be used. In this reaction, the sensitizer bleaches the composition, and the initiation may then progress through the layer or layers of material.

By way of example, a preferred class of ketone sensitizers has the formula:

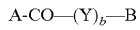

A-CO—(Y)$_b$—B where Y is CO or $CR^{11}R^{12}$, where $R^{11}$ and $R^{12}$ can be the same or different, and can be hydrogen, alkyl, alkaryl or aralkyl, b is one or zero, and A and B can be the same or different and can be substituted (having one or more non-interfering substituents) or unsubstituted aryl, alkyl, alkaryl, or aralkyl groups, or together A and B can form a cyclic structure which can be a substituted or unsubstituted cycloaliphatic, aromatic heteroaromatic or fused aromatic ring.

Suitable ketones of the above formula include monoketones (b=0) such as 2,2-, 4,4- or 2,4-dihydroxybenzophenone, di-2-pyridyl ketone, di-2-furanyl ketone, di-2-thiophenyl ketone, benzoin, fluorenones, quinones, e.g., chloroquinone, 2-aza-3-carboxy-9-fluorenone, and the like, chalcone, Michler's ketone, 2-fluoro-9-fluorenone, 2-chlorothioxanthone, acetophenone, benzophenone, 1- or 2-acetonaphthone, 9-acetylantracene, 2-, 3- or 9-acetylphenanthrene, 4-acetylbiphenyl, propiophenone, n-butyrophenone, valerophenone, 2-, 3- or 4-acetylpyridine, 3-acetylcoumarin and the like. Suitable diketones include aralkyldiketones such as anthraquinone, phenanthrenequinone, o-, m- and p-diacetylbenzene, 1,3-, 1,4-, 1,5-, 1,6-, 1,7- and 1,8-diacetylnaphthalene, 1,5-, 1,8- and 9,10-diacetylanthracene, and the like. Suitable .alpha.-diketones (b=1 and X=CO) include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-, 3,3'- and 4,4'-dihydroxylbenzil, furil, di-3,3'-indolylethanedione, 2,3-bornanedione (camphorquinone), 1,2-cyclohexanedione, 1,2-naphthaquinone, acenaphthaquinone, and the like.

Other preferred sensitizers include Rose Bengal, Methylene Violet, Fluorescein, Eosin Yellow, Eosin Y, Ethyl Eosin, Eosin Bluish, Erythrosin Yellowish Blend, 4',5'-Dibromofluorescein.

Among onium cationic photoinitiators, sulfonium compounds are preferred for thermal stability.

Another class of photoinitiators suitable for use in the present invention comprises photoactivatable organometallic complex salts such as those described in U.S. Pat. Nos. 5,059,701; 5,191,101; and 5,252,694. Such salts of organometallic cations have the general formula:

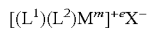

$[(L^1)(L^2)M^m]^{+e}X^-$ wherein $M^m$ represents a metal atom selected from elements of periodic groups IVB, VB, VIB, VIIB, and VIII, desirably Cr, Mo, W, Mn, Re, Fe, and Co;

$L^1$ represents none, one, or two ligands contributing it-electrons, wherein the ligands may be the same or different, and each ligand may be selected from the group consisting of substituted and unsubstituted alicyclic and cyclic unsaturated compounds and substituted and unsubstituted carbocyclic aromatic and heterocyclic aromatic compounds, each capable of contributing two to twelve π electrons to the valence shell of the metal atom M.

Desirably, $L^1$ is selected from the group consisting of substituted and unsubstituted η3-allyl, η5-cyclopentadienyl, η7-cycloheptatrienyl compounds, and η6-aromatic compounds selected from the group consisting of η6-benzene and substituted η6-benzene compounds (for example, xylenes) and compounds having 2 to 4 fused rings, each capable of contributing 3 to 8 π electrons to the valence shell of $M'''$;

$L^2$ represents none or 1 to 3 ligands contributing an even number of .sigma.-electrons, wherein the ligands may be the same or different, and each ligand may be selected from the group consisting of carbon monoxide, nitrosonium, triphenyl phosphine, triphenyl stibine and derivatives of phosphorous, arsenic and antimony, with the proviso that the total electronic charge contributed to $M'''$ by $L^1$ and $L^2$ results in a net residual positive charge of e to the complex; e is an integer having a value of 1 or 2, the residual charge of the complex cation; and X is a halogen-containing complex anion, as described above.

Suitable commercially available cationic initiators include, but are not limited to, aromatic sulfonium complex salts FX-512™ (Minnesota Mining and Manufacturing Company, St. Paul, Minn.), CD-1012™ and CD-1010™ (Sartomer, Exton, Pa.); UVOX™ UVI-6976, an aromatic sulfonium complex salt (Dow Chemical, Midland, Mi.); and IRGACURE™ 261, a cationic organometallic complex salt (BASF Corporation, Florham Park, N.J.).

Where the cationic photoinitiator used for curing the adhesive composition is a metallocene salt catalyst, it optionally is accompanied by an accelerator such as an oxalate ester of a tertiary alcohol as described in U.S. Pat. No. 5,436,063, although this is optional. Oxalate co-catalysts that may be used include those described in U.S. Pat. No. 5,252,694. The accelerator may comprise from about 0.01 to about 5 weight percent, desirably from about 0.1 to about 4 weight percent of the structural adhesive layer composition, based on the total weight of the resin (THFA copolymer, epoxy resin, polyether polyol and film-forming polymer) present in the composition.

The adhesive composition comprises one or more cationic photoinitiators in an amount, which varies depending on the light source and the degree of exposure. Desirably, the adhesive composition comprises one or more cationic photoinitiators in an amount of 0.1 to 1 parts by weight, based on 100 parts total weight of the adhesive composition. More desirably, the structural adhesive layer of the structural bonding tape of the present invention comprises one or more photoinitiators in an amount of from about 0.2 to about 0.5 parts by weight, based on 100 parts total weight of the adhesive composition.

The cured, partially cured or uncured adhesive composition may be coated on a substrate to form an adhesive article. For example, the substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose).

Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the crosslinked composition, crosslinked composition, or both. Such treatments include, for example, application of primer layers, surface modification layer (e.g., corona treatment or surface abrasion), or both.

In some embodiments the adhesive article comprises a nonwoven scrim embedded in the adhesive layer.

In some embodiments, the substrate is a release liner to form an adhesive article of the construction substrate/adhesive layer/release liner. The adhesive layer may be cured, uncured or partially cured. Release liners typically have low affinity for the curable composition. Exemplary release liners can be prepared from paper (e.g., Kraft paper) or other types of polymeric material. Some release liners are coated with an outer layer of a release agent such as a silicone-containing material or a fluorocarbon-containing material.

The present disclosure further provides a method of bonding comprising the steps of providing a substrate (or workpiece) having a layer of the curable composition on a surface thereof, exposing the adhesive layer to actinic radiation (such as UV) to initiate curing, and affixing the first substrate to a second substrate (or workpiece), and optionally heating the bonded workpieces.

EXAMPLES

TABLE 1

| | Materials |
|---|---|
| ARCOL LHT 240 | Polyether polyol obtained from Bayer MaterialScience LLC, Pittsburgh, PA |
| LOTADER AX8900 | Poly(ethylene/methyl acrylate/glycidyl methacrylate) obtained from Arkema Inc., King of Prussia, PA |
| HYTEMP 4054 | Polyacrylate elastomer obtained from Zeon Chemicals L.P., Louisville, KY |
| EPON 1001F | Solid epoxy resin comprised of diglycidyether of bisphenol A obtained from Momentive Specialty Chemicals, Inc., Columbus, OH |
| EPON 828 | Liquid epoxy resin comprised of diglycidyether of bisphenol A obtained from Momentive Specialty Chemicals, Inc., Columbus, OH |
| EPONEX 1510 | Liquid epoxy resin comprised of diglycidyether of hydrogenated bisphenol A obtained from Momentive Specialty Chemicals, Inc., Columbus, OH |
| LEVAPREN 700HV | Ethylene-vinyl acetate copolymer obtained from Lanxess Corporation, Pittsburgh, PA |
| PHENOXY PKHA | Phenoxy resin obtained from InChem Corporation, Rock Hill, SC |

TABLE 1-continued

Materials

| | |
|---|---|
| UVI6976 | Triaryl-sulfonium hexafluoroantimonate, 50 wt % in propylene carbonate obtained from Aceto, Port Washington, NY |
| GPTMS | 3-(Glycidoxypropyl) trimethoxysilane obtained from UCT, Inc., Bristol, PA |
| HBA | 4-Hydroxybutyl acrylate obtained from San Esters, New York City, NY |
| PAG210S | Triarylsulfonium salt with proprietary phosphate anion obtained from San-Apro Ltd., Tokyo, Japan |
| Propylene carbonate | Solvent obtained from Sigma-Aldrich, St. Louis, MO |
| MA | Methyl acrylate obtained from BASF, Florham Park, NJ |
| 1,4-Cyclohexanedimethanol | 1,4-Cyclohexanedimethanol obtained from Sigma-Aldrich, St. Louis, MO |
| 1,6-Hexanediol | 1,6-Hexanediol obtained from Sigma-Aldrich, St. Louis, MO |
| BA | Butyl acrylate obtained from BASF, Florham Park, NJ |
| GMA | Glycidyl methacrylate obtained from Dow Chemical, Midland, MI |
| IRGACURE 651 | Benzyldimethyl ketal photoinitiator obtained from BASF, Florham Park, NJ |
| IOTG | Isooctyl thioglycolate obtained from Evans Chemetics LP, Teaneck, NJ |
| 2-POEA | Phenoxyethyl acrylate (VISCOAT #192) obtained from San Esters, New York City, NY |
| IBOA | Isobornyl acrylate (IBXA) obtained from San Esters, New York City, NY |
| THFA | Tetrahydrofurfuryl acrylate (V-150) obtained from San Esters, New York City, NY |
| E-coated steel panel | ACT cold-rolled steel (C710 C20 DTW unpolished) with ED-5050B coating, ACT Laboratories Inc., Hillsdale, MI |
| CRASTIN test pieces | 30% glass-reinforced polybutylene terephthalate (PBT), obtained from DuPont, Wilmington, DE, under the trade designation "LW9030 BK851" |
| Tempered glass test pieces | Clear tempered glass obtained from Industrial Glass Products, Los Angeles, CA |
| Erythrosin B | Erythrosin B, spirit soluble, obtained from Sigma-Aldrich, St. Louis, MO |

Test Methods

Dynamic Overlap Shear

Adhesion to e-coated steel ('stl') was determined by measuring the overlap shear strength of bonded specimens. Substrate coupons measuring 25 mm×50.8 mm were wiped with a 1:1 (v:v) solution of isopropyl alcohol and water, and were allowed to air-dry. Release liner was removed from one side of a 12.7 mm×25 mm portion of the adhesive composition and the composition was applied to one coupon. The second release liner was removed and the composition was exposed to a microwave source (0.9-1.2 J/cm$^2$ UVA, H-bulb, Heraeus Noblelight America, Gaithersburg, Md.) as measured by a UVICURE Plus Integrating Radiometer (EIT, Inc., Sterling, Va.). A second coupon was applied to the irradiated sample, thus closing the bond. The assembly was wet-out by means of applying a static 6 kg load to the specimen for 30-60 seconds. Specimens were allowed to cure at ambient temperature and humidity for 24 hours prior to testing.

A dynamic overlap shear test was performed at ambient temperature using an INSTRON TENSILE TESTER MODEL 5581 (Instron Corp., Canton, Mass.). Test specimens were loaded into the grips and the crosshead was operated at 2.5 mm per minute, loading the specimen to failure. Stress at break was recorded in units of MPa.

Cleavage Test

Adhesion of plastic to glass was determined by measuring the cleavage strength of bonded specimens. Plastic test pieces, made of CRASTIN, measuring 22 mm×28 mm×4 mm, and tempered glass plaques, measuring 127 mm×50 mm×4 mm were wiped with a 1:1 (v:v) solution of isopropyl alcohol and water and were allowed to air-dry. Release liner was removed from a 22 mm×28 mm portion of the adhesive composition and this portion was applied to the plastic test piece. Wet-out was accomplished by means of applying a 1-3 kg weight to the test piece for 30 seconds. The second release liner was removed and the adhesive portion was exposed to a microwave source (0.9-1.2 J/cm$^2$ UVA, H-bulb, Heraeus Noblelight America, Gaithersburg, Md.), as measured by a UVICURE Plus Integrating Radiometer (EIT, Inc., Sterling, Va.). The irradiated sample was applied to a tempered glass plaque and wet-out by applying a 6 kg weight to the bonded assembly for 30-60 seconds. The assembly was allowed to cure 24 hours under ambient conditions prior to testing.

Cured assemblies were mounted vertically (i.e., with the plane of the bond in a vertical orientation) in an INSTRON TENSILE TESTER MODEL 5565 (INSTRON CORP., Canton, Mass.). A 70 mm lever arm was attached to the plastic test piece, perpendicular to the plane of the bond and was pulled upwardly (parallel to the plane of the bond) at a rate of 2.5 mm per minute. The maximum value at break was recorded in N.

FTIR-ATR Measurements

Attenuated total reflectance (ATR) measurements were made on a NICOLET *NEXUS* 670 IR SPECTROMETER (Thermo Fisher Scientific Inc., Waltham, Mass.) with MCT/A detector and SMART OMNI single-bounce germanium (Ge) ATR accessory. Spectra consisted of thirty-two scans with a resolution of four (data spacing=2 cm$^{-1}$) over the range of 4000-650 cm$^{1}$.

ATR spectra were taken on samples both before ("Initial") and after ("Exposed") the specified cure profile. For "H bulb, 24 hr, RT" samples, the top liner was removed and the adhesive exposed to two passes at 32 fpm from a FUSION LIGHT HAMMER 10 equipped with H bulb (Heraeus Noblelight America, Gaithersburg, Md.). This corresponded to a total exposure (J/cm$^2$) of 1 UVA, 1 UVB, 0.25 UVC, 1.1 UVV as measured by a Power Puck® II radiometer (EIT, Inc., Sterling, Va.). The release liner was re-applied and the sample was subsequently held at room temperature (ca. 21° C.) for 24 hours prior to ATR.

For each ATR measurement, the release liner was peeled from one side of the tape sample. The resulting adhesive surface was pressed down into good contact with the Ge crystal for the duration of the spectrum acquisition. Afterwards, the sample was peeled from the Ge crystal and the crystal cleaned with ethyl acetate.

The size of the 910 cm$^1$ absorbance was monitored as an indicator of epoxy conversion, by comparing "Initial" vs. "Exposed" spectra of the same composition. Sample were designated Uncured (U) if the 910 cm$^1$ peak was unchanged, Partially Cured (P) if the peak was diminished but still visible, or Cured (C) if no discernible peak remained. Spectra for both faces of the tape (Front and Back) were obtained and analyzed, where 'front' was the directly-irradiated side and 'back' was the through-thickness-exposed side).

Creep Performance Test

The creep performance and dimensional stability of compositions was determined using an MCR 302 RHEOMETER (Anton Paar GmbH, Graz, Austria). A 0.6 mm thick sample of each composition was loaded between 25 mm parallel plates and a normal force ($F_N$) of 1 N was applied. A constant stress of 1000 Pa was applied for 300 seconds, then a constant stress of 0 Pa was applied for 600 seconds. The strain at 300 seconds ($\gamma_{300s}$) was recorded to characterize the creep behavior ("cold-flow") of the composition and was given in % strain.

Acrylic Copolymer Rheology

The glass transition temperature, $T_g$, of the acrylic copolymers was determined using an MCR 302 rheometer (ANTON PAAR GmbH, Graz, Austria) operating in oscillatory mode. Samples were loaded onto 8 mm parallel plates and a normal force of 0.1 N was applied. The sample was first cooled from 30° C. to −50 OC at 10° C. per minute while the strain (y) was reduced from 1-0.01% and the normal force (FN) was increased from 0.1-0.5 N. The sample was then analyzed while heating from −50° C. to 150° C. at 10° C. per minute while y was increased from 0.01-5% and FN was reduced from 0.5-0.05 N. The oscillatory frequency (F) was 1 Hz in all experiments. The temperature coinciding with the primary peak in tan(6) was recorded as the $T_g$, given in units of ° C.

Acrylic Copolymer Synthesis Methods

Method 1

Acrylic copolymer mixtures were prepared by the method of Karim (U.S. Pat. No. 5,721,289). For each composition, all acrylic monomers and 0.04 parts IRGACURE 651 photoinitiator were mixed in a glass jar. For F1 only, 29 parts EPON 828 and 10 parts EPON 1001F were additionally added. The solutions were purged with nitrogen and exposed to UVA light with stirring until the viscosity of the mixture was suitable for coating (500-5000 cP). A mixture of 100 parts of the above syrup, 0.2 parts IRGACURE 651, and any remaining components (epoxies and/or alcohols) was made. The mixture was coated at 0.75 mm thickness between two 0.050 mm silicone-coated poly(ethylene terephthalate) release liners. This dual-liner construct was irradiated from each side with 1200 mJ/cm$^2$ UVA from 350BL fluorescent bulbs, as measured by a UVIRAD LOW ENERGY UV INTEGRATING RADIOMETER (EIT, Inc., Sterling, Va.). Release liners were removed prior to subsequent compounding.

Method 2

Acrylic copolymers were prepared by the method of Hamer (U.S. Pat. No. 5,804,610). Solutions were prepared by combining the acrylic monomers, radical photoinitiator (IRGACURE 651) and chain-transfer agent (IOTG) in an amber glass jar and swirling by hand to mix. The solution was divided into 25 g aliquots within heat sealed compartments of an ethylene vinyl acetate-based film, immersed in a 16° C. water bath, and polymerized using UV light (UVA=4.7 mW cm$^{-2}$, 8 minutes per side).

Hot-Melt Compounding and Coating

Compositions were prepared using a BRABENDER mixer (C.W. Brabender, Hackensack, N.J.) equipped with a 50 or 250 g capacity heated mix head and kneading elements. The mixer was operated at the desired mixing temperature of 120-150° C. and the kneading elements were operated at 100 rpm. First the acrylic copolymer, was added and allowed to mix for several minutes. The solid epoxy resin and hydroxy-functional film-forming polymer were added and allowed to mix until uniformly distributed through the mixture. The liquid epoxy resin, polyol, and silane materials were added slowly until uniformly distributed. The resulting mixture was allowed to stir for several minutes then the photoacid generator was added drop-wise. The mixture was allowed to stir several minutes and was then transferred to an aluminum pan and allowed to cool. The mass of material was placed between two release liners and was pressed, with heating to 95° C., into 0.6 mm thick film by means of a hydraulic press (Carver Inc., Wabash, Ind.).

The acrylic mixtures listed in Table 3 were prepared for use in subsequent hot-melt compounding experiments. Samples F1-F4 were prepared according to acrylic copolymer synthesis METHOD 1. This method was representative of that taught by Karim (U.S. Pat. No. 5,721,289). In general, the acrylic monomers, epoxy resins, and radical photoinitiator were combined and partially polymerized to a syrup to a coatable viscosity, thus yielding the acrylic mixture. Samples F5 and F6 were prepared according to acrylic copolymer synthesis METHOD 2. This method was representative of that taught by Hamer (U.S. Pat. No. 5,804,610). In general, the acrylic monomers, radical photoinitiator, and chain-transfer agent were combined and the acrylic was fully cured, thus yielding the acrylic mixture.

TABLE 3

Acrylic Mixtures for Compounding.

| COMPOSITION (wt %) | F1 | F2 | F3 | F4 | F5 | F6 |
|---|---|---|---|---|---|---|
| 2-POEA | 43 | | | | | |
| IBOA | 14 | | | | | |
| BA | | 35 | 50 | 49 | 50 | 49 |
| THFA | | 23 | 50 | 49 | 50 | 49 |
| GMA | | | | 2 | | 2 |
| EPON 828 | 29 | 31 | | | | |
| EPON 1001F | 10 | 8 | | | | |
| 1,4-CYCLOHEXANE-DIMETHANOL | 2 | 4 | | | | |
| 1,6-HEXANEDIOL | 2 | | | | | |
| IRGACURE 651 | 0.24 | 0.24 | 0.24 | 0.24 | 0.2 | 0.2 |
| IOTG | | | | | 0.1 | 0.1 |

Acrylic mixtures from Table 3 were further processed to yield the epoxy-acrylic compositions listed in Table 4. Compositions were prepared by a hot-melt compounding procedure adapted from Karim (U.S. Pat. No. 5,721,289) and Weglewski (US2002/0182955 A1). In general, the acrylic mixture or elastomer, epoxy resin, polyol, thermoplastic, silane, and photoacid generator were combined in a heated mixer, transferred to release liners, and pressed to the desired thickness for subsequent evaluation/mechanical testing.

TABLE 4

| | CE-A[a] | CE-B[b] | CE-C[c] | CE-D[d] | EX-1 | EX-2 | EX-3 | EX-4 |
|---|---|---|---|---|---|---|---|---|
| COMPOSITION (wt %) | | | | | | | | |
| Acrylic Mixture | F1 | F2 | LOTADER AX8900 | HYTEMP 4054 | F5 | F6 | F3 | F4 |
| Acrylic Mixture Content | 97 | 97 | 22 | 22 | 32 | 32 | 32 | 32 |
| EPON 828 | | | 38 | 39 | | | | |
| EPONEX 1510 | | | | | 19 | 19 | 19 | 19 |
| EPON 1001F | | | 7 | 7 | 19 | 19 | 19 | 19 |
| ARCOL 240 LHT | | | 31 | 31 | 10 | 10 | 10 | 10 |
| GPTMS | | | 1 | | 1 | 1 | 1 | 1 |
| LEVAPREN 700HV | | | | | 10 | 10 | 10 | 10 |
| PHENOXY PKHA | | | | | 10 | 10 | 10 | 10 |
| UVI 6976 | 2.9 | 2.8 | 1.5 | 1.4 | 0.5 | 0.5 | 0.5 | 0.5 |
| OVERLAP SHEAR (MPa) | | | | | | | | |
| H-bulb, 24 hr, RT (stl) | 0.3 | 1.0 | — | — | 8.5 | 6.5 | 10.8 | 6.0 |
| CLEAVAGE (N) | | | | | | | | |
| H-bulb, 24 hr, RT | 71 | 12 | — | — | 151 | 161 | 187 | 158 |
| FTIR-ATR (front/back)[e] | | | | | | | | |
| H-bulb, 24 hr, RT | C/C | C/C | — | P/U | C/C | C/C | C/C | C/C |

[a] U.S. Pat. No. 5,721,289 Example 10
[b] U.S. Pat. No. 5,721,289 Example 4
[c] US2002/0182955 A1: [0073] Specification; Composition exhibited macrophase separation upon compounding and was not evaluated further.
[d] US2002/0182955 A1: Example AE-1; Composition permeated release liner upon coating and exhibited poor film-forming properties.
[e] ATR assessed cure uniformity after the specified cure profile. The epoxy conversion was recorded as Cured (C), Partial Cured (P), or Uncured (U) for each surface.

Further compositions were made that incorporated different thermoplastic components (Table 5). Compositions were prepared by the same hot-melt compounding procedure detailed above, transferred to release liner, and pressed to the desired thickness for subsequent evaluation/mechanical testing. Surprisingly, epoxy-acrylate compositions with these thermoplastics demonstrated decreased creep under load (uncured) and retained useful ultimate bond strengths once cured.

TABLE 5

| | EX-2 | EX-5 | EX-6 | CE-E |
|---|---|---|---|---|
| COMPOSITION (wt %) | | | | |
| Acrylic Mixture | F6 | F6 | F6 | F6 |
| Acrylic Mixture Content | 32 | 34 | 34 | 38 |
| EPONEX 1510 | 19 | 21 | 21 | 24 |
| EPON 1001F | 19 | 21 | 21 | 24 |
| ARCOL 240 LHT | 10 | 11 | 11 | 12 |
| GPTMS | 1 | 1 | 1 | 1 |
| LEVAPREN 700HV | 10 | 11 | | |
| PHENOXY PKHA | 10 | | 11 | |
| UVI 6976 | 0.5 | 0.5 | 0.5 | 0.5 |
| OVERLAP SHEAR (MPa) | | | | |
| H-bulb, 24 hr, RT (stl) | 6.5 | 8.9 | 11.5 | 10 |
| CLEAVAGE (N) | | | | |
| H-bulb, 24 hr, RT | 161 | 123 | 45 | 125 |
| CREEP (% strain) | 167 | 474 | 482 | 1250 |

Additional compositions were made to investigate the effect of acrylic component loading (Table 6). Compositions were prepared by the same hot-melt compounding procedure detailed above, transferred to release liner, and pressed to the desired thickness for subsequent evaluation/mechanical testing.

TABLE 6

| | EX-7 | EX-2 | EX-8 | CE-F | CE-G |
|---|---|---|---|---|---|
| COMPOSITION (wt %) | | | | | |
| Acrylic Mixture | F6 | F6 | F6 | F6 | F6 |
| Acrylic Mixture Content | 15 | 32 | 48 | 64 | 82 |
| EPONEX 1510 | 24 | 19 | 14 | 10 | 5 |
| EPON 1001F | 24 | 19 | 14 | 10 | 5 |
| ARCOL 240 LHT | 12 | 10 | 7 | 5 | 2 |
| GPTMS | 1 | 1 | 1 | 1 | 1 |
| LEVAPREN 700HV | 12 | 10 | 7 | 5 | 2 |
| PHENOXY PKHA | 12 | 10 | 7 | 5 | 2 |
| UVI 6976 | 0.5 | 0.5 | 0.5 | 0.5 | 0.5 |
| OVERLAP SHEAR (MPa) | | | | | |
| H-bulb, 24 hr, RT (stl) | 5.2 | 6.5 | 5 | 2.6 | 0.6 |
| CLEAVAGE (N) | | | | | |
| H-bulb, 24 hr, RT | 61 | 161 | 128 | 42 | 30 |

The acrylic mixtures listed in Table 7 were prepared for use in subsequent hot-melt compounding experiments. They were prepared according to acrylic copolymer synthesis METHOD 2. In general, the acrylic monomers, radical photoinitiator, and chain-transfer agent were combined and the acrylic was fully cured, thus yielding the acrylic mixture.

TABLE 7

Different Acrylic Compositions.

| COMPOSITION (wt %) | F7 | F8 | F9 | F10 | F11 | F12 |
|---|---|---|---|---|---|---|
| 2-POEA | 75 | | | | | |
| IBOA | 25 | | | | | |
| BA | | 70 | 49 | 49 | 75 | 75 |
| MA | | 20 | | | | |
| THFA | | | | 49 | 23 | 23 |
| EOEOEA | | | 49 | | | |
| GMA | | 10 | 2 | | 2 | |
| HBA | | | | 2 | | 2 |
| IRGACURE 651 | 0.2 | 0.2 | 0.2 | 0.2 | 0.2 | 0.2 |
| IOTG | 0.1 | 0.1 | 0.1 | 0.1 | 0.1 | 0.1 |

Compositions were made in which the acrylic copolymer composition was varied (Table 8). Compositions were prepared by the same hot-melt compounding procedure detailed above, transferred to release liner, and pressed to the desired thickness for subsequent evaluation/mechanical testing.

TABLE 8

| | EX-1 | EX-2 | CE-H | CE-I | CE-J | EX-9 | CE-K | CE-L | EX-10 |
|---|---|---|---|---|---|---|---|---|---|
| COMPOSITION (wt %) | | | | | | | | | |
| Acrylic Mixture | F5 | F6 | F7 | F8 | F9 | F10 | F11 | F12 | F6 |
| Acrylic Mixture Content | 32 | 32 | 32 | 32 | 32 | 32 | 32 | 32 | 32 |
| EPONEX 1510 | 19 | 19 | 19 | 19 | 19 | 19 | 19 | 19 | 19 |
| EPON 1001F | 19 | 19 | 19 | 19 | 19 | 19 | 19 | 19 | 19 |
| ARCOL 240 LHT | 10 | 10 | 10 | 10 | 10 | 10 | 10 | 10 | 10 |
| GPTMS | 1 | 1 | 1 | 1 | 1 | 1 | 1 | 1 | 1 |
| LEVAPREN 700HV | 10 | 10 | 10 | 10 | 10 | 10 | 10 | 10 | 10 |
| PHENOXY PKHA | 10 | 10 | 10 | 10 | 10 | 10 | 10 | 10 | 10 |
| UVI 6976 | 0.5 | 0.5 | 0.5 | 0.5 | 0.5 | 0.5 | 0.5 | 0.5 | |
| PAG210S | | | | | | | | | 0.5 |
| ACRYLIC $T_g$ (° C.) | −24 | −23 | 25 | −23 | −44 | −24 | −33 | −34 | −23 |
| OVERLAP SHEAR (MPa) | | | | | | | | | |
| H-bulb, 24 hr, RT (stl) | 8.5 | 6.5 | 2.6 | 0.4 | 2.4 | 6.9 | 1.5 | 1.1 | 6.2 |
| CLEAVAGE (N) | | | | | | | | | |
| H-bulb, 24 hr, RT | 151 | 161 | 71 | 20 | 65 | 126 | 48 | 35 | 156 |
| FTIR-ATR | | | | | | | | | |
| H-bulb, 24 hr, RT | C/C | C/C | C/C | P/P | C/C | C/C | C/C | C/C | C/C |

Compositions were made by incorporating a sensitizer/dye (Table 9). Compositions were prepared by the same hot-melt compounding procedure detailed above, transferred to release liner, and pressed to the desired thickness for subsequent evaluation/mechanical testing.

TABLE 9

| | EX-10 | EX-11 |
|---|---|---|
| COMPOSITION (wt %) | | |
| Acrylic Mixture | F6 | F6 |
| Acrylic Mixture Content | 33 | 33 |
| EPONEX 1510 | 20 | 20 |
| EPON 1001F | 20 | 20 |
| ARCOL 240 LHT | 10 | 10 |
| GPTMS | 1 | 1 |

TABLE 9-continued

| | EX-10 | EX-11 |
|---|---|---|
| LEVAPREN 700HV | 10 | 10 |
| PHENOXY PKHA | 10 | 10 |
| UVI 6976 | 0.5 | 0.5 |
| Erythrosin B | 0.03 | 0.01 |
| OVERLAP SHEAR (MPa) | | |
| H-bulb, 24 hr, RT (stl) | 4.5 | 5.4 |
| FTIR-ATR (front/back) | | |
| H-bulb, 24 hr, RT | C/C | C/C |

What is claimed is:

1. A curable composition comprising
   a. a tetrahydrofurfuryl (meth)acrylate copolymer;
   b. an epoxy resin component;
   c. a polyether polyol;
   d. a hydroxy-functional film-forming polymer chosen from phenoxy resins, polycaprolactone polyols, polyester polyols, and polyvinyl acetal resins; and
   e. a cationic photoinitiator.

2. The curable composition of claim 1 wherein the tetrahydrofurfuryl (meth)acrylate copolymer comprises
   a) a tetrahydrofurfuryl (meth)acrylate monomer;
   b) a C1-C8 alkyl (meth)acrylate ester monomer;
   c) a cationically reactive functional (meth)acrylate ester monomer.

3. The curable composition of claim 1 wherein the weight ratio of epoxy resin to acrylate polymer is from 1.1:1 to 5:1.

4. The curable composition of claim 1 wherein the epoxy resin comprises cationically reactive (meth)acrylate ester functional monomer.

5. The curable composition of claim 1 wherein the cationic photoinitiator is a sulfonium or iodonium salt.

6. The curable composition of claim 1 wherein the epoxy resin component comprises two or more epoxy resins, wherein at least one epoxy resin has an epoxy equivalent weight of from about 300 to about 500, and at least one epoxy resin has an epoxy equivalent weight of from about 1000 to about 1200.

7. The curable composition of claim 1 wherein the tetrahydrofurfuryl (meth)acrylate copolymer has no acid functional monomer units.

8. The curable composition of claim 2 wherein the molar average carbon number of the C1-C8 alkyl (meth)acrylate ester is 3-6.

9. The curable composition of claim 1 wherein the tetrahydrofurfuryl (meth)acrylate copolymer is a tetrahydrofurfuryl/butyl acrylate copolymer.

10. The curable composition of claim 1 comprising:
   a. 15 to 50 parts of a tetrahydrofurfuryl (meth)acrylate copolymer;
   b. 25 to 50 parts of an epoxy resin component;
   c. 5-15 parts of a polyether polyol;
   d. a hydroxy-functional film-forming polymer;
   wherein the sum of a) to d) is 100 parts by weight; and
   e. a cationic photoinitiator.

11. The curable composition of claim 1 wherein the hydroxyl-functional film-forming polymer has a hydroxyl number of at least 0.01.

12. The curable composition of claim 1 further comprising a sensitizer.

13. The curable composition of claim 12 wherein the sensitizer is selected from ketones, coumarin dyes, xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes.

14. A method of preparing the curable composition of claim 1 comprising the step of:
   a) at least partially polymerizing a monomer mixture of (monomers) to produce a tetrahydrofurfuryl (meth) acrylate copolymer;
   b) combining the copolymer with an epoxy resin, polyether polyol, the hydroxy-functional film-forming polymer a cationic photoinitiator and optionally additional free-radical photoinitiator;
   c) optionally coating the mixture;
   d) photopolymerizing the mixture.

15. The method of claim 14 wherein the monomer mixture of step a) is partially polymerized to a syrup copolymer composition comprising a solute tetrahydrofurfuryl (meth) acrylate copolymer in solvent monomer.

16. The method of claim 14 where the monomer mixture of step a) is fully polymerized to a THFA copolymer.

17. An adhesive article comprising a substrate and a layer of the curable composition of claim 1 on a surface thereof.

18. The adhesive article of claim 17, wherein the composition has been partially cured.

19. A method of bonding comprising the steps of providing a substrate having a layer of the curable composition of claim 1 on a surface thereof, exposing the curable adhesive layer to actinic radiation to initiate curing, affixing the first substrate to a second substrate, and optionally heating the bonded substrates.

* * * * *